United States Patent
Swazinna et al.

(10) Patent No.: US 12,498,681 B2
(45) Date of Patent: Dec. 16, 2025

(54) METHOD FOR CONFIGURING A CONTROL AGENT FOR A TECHNICAL SYSTEM, AND CONTROL DEVICE

(71) Applicant: Siemens Aktiengesellschaft, Munich (DE)

(72) Inventors: Phillip Swazinna, Neufahrn (DE); Steffen Udluft, Eichenau (DE); Thomas Runkler, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 423 days.

(21) Appl. No.: 18/015,290

(22) PCT Filed: Jul. 12, 2021

(86) PCT No.: PCT/EP2021/069269
§ 371 (c)(1),
(2) Date: Jan. 9, 2023

(87) PCT Pub. No.: WO2022/013125
PCT Pub. Date: Jan. 20, 2022

(65) Prior Publication Data
US 2023/0266721 A1 Aug. 24, 2023

(30) Foreign Application Priority Data

Jul. 15, 2020 (EP) .................................... 20185973

(51) Int. Cl.
*G05B 13/02* (2006.01)

(52) U.S. Cl.
CPC ................................. *G05B 13/027* (2013.01)

(58) Field of Classification Search
CPC .......... G05B 13/027; G06N 5/01; G06N 7/01; G06N 20/10
(Continued)

(56) References Cited

U.S. PATENT DOCUMENTS

| | | | |
|---|---|---|---|
| 2019/0250568 A1* | 8/2019 | Li | G06N 7/01 |
| 2020/0104684 A1* | 4/2020 | Vecerik | G06N 3/047 |

(Continued)

OTHER PUBLICATIONS

S. Fujimoto, D. Meger and D. Precup , "Off-Policy Deep Reinforcement Learning without Exploration"—International Conference on Machine Learning 2019, pp. 2052-2062.
(Continued)

*Primary Examiner* — Jigneshkumar C Patel
(74) *Attorney, Agent, or Firm* — Schmeiser, Olsen & Watts, LLP

(57) ABSTRACT

To configure a control agent, predefined training data are read in, which specify state datasets, action datasets and resulting performance values of the technical system. Using the training data, a data-based dynamic model is trained to reproduce a resulting performance value using a state dataset and an action dataset. An action evaluation process is also trained to reproduce the action dataset using a state dataset and an action dataset after an information reduction has been carried out, wherein a reproduction error is determined. To train the control agent, training data are supplied, the trained action evaluation process and the control agent. Performance values output by the trained dynamic model are fed into a predefined performance function. Reproduction errors are fed as performance-reducing influencing variables into the performance function. The control agent is trained to output an action dataset optimising the performance function on the basis of a state dataset.

11 Claims, 2 Drawing Sheets

(58) Field of Classification Search
USPC .............................................................. 700/1
See application file for complete search history.

(56) References Cited

U.S. PATENT DOCUMENTS

| | | |
|---|---|---|
| 2020/0142420 A1 | 5/2020 | Kusari |
| 2021/0177307 A1* | 6/2021 | Song ...................... G06N 3/045 |
| 2022/0036181 A1* | 2/2022 | Ott ........................... G06N 3/08 |

OTHER PUBLICATIONS

A. Kumar, J. Fu, G. Tucker and S. Levine "Stabilizing Off-Policy Q-Learning via Bootstrapping Error Reduction" in Advances in Neural Information Processing Systems, pp. 11761-11771, 2019.

PCT International Search Report and Written Opinion of International Searching Authority mailed Nov. 4, 2021 corresponding to PCT International Application No. PCT/EP2021/069269 filed Jul. 13, 2021.

* cited by examiner

METHOD FOR CONFIGURING A CONTROL AGENT FOR A TECHNICAL SYSTEM, AND CONTROL DEVICE

CROSS-REFERENCE TO RELATED APPLICATIONS

This application claims priority to PCT Application No.PCT/EP2021/069269, having a filing date of Jul. 12, 2021, which claims priority to EP Application No.20185973.3, having a filing date of Jul. 15, 2020, the entire contents both of which are hereby incorporated by reference.

FIELD OF TECHNOLOGY

The following relates to a method for configuring a control agent for a technical system, and control device.

BACKGROUND

Data-driven machine learning methods are increasingly being used for controlling complex technical systems, such as e.g., gas turbines, wind turbines, steam turbines, motors, robots, chemical reactors, milling machines, production plants, cooling plants or heating plants. Said methods involve in particular artificial neural networks being trained by means of reinforcement learning methods to generate an optimized, state-specific control action for a respective state of the technical system in order to control the technical system. Such a control agent trained to control a technical system is frequently also referred to as a policy, or agent for short.

Successfully training a control agent generally requires large volumes of operating data for the technical system as training data. The training data should cover the operating states and other operating conditions of the technical system as representatively as possible.

In many cases, such training data are in the form of databases storing operating data recorded on the technical system. Such stored training data are frequently also referred to as batch training data or offline training data. Based on experience, the success of a training is generally dependent on the extent to which the possible operating conditions of the technical system are covered by the batch training data. Accordingly, it can be expected that control agents trained using batch training data behave unfavorably in operating states for which only a handful of batch training data were available.

To improve the control behavior in regions of the state space that have little coverage by training data, the publications "Off-Policy Deep Reinforcement Learning without Exploration" by S. Fujimoto, D. Meger and D. Precup in International Conference on Machine Learning 2019 (pp. 2052-2062) and "Stabilizing Off-Policy Q-Learning via Bootstrapping Error Reduction" by A. Kumar, J. Fu, G. Tucker and S. Levine in Advances in Neural Information Processing Systems, pp. 11761-11771, 2019, propose restricting the selectable control actions by way of suitable secondary conditions and training a so-called Q function on that basis. Training Q functions is frequently very data intensive, however.

SUMMARY

An aspect relates to specify a method for configuring a control agent for a technical system and a control device for controlling the technical system that permit more efficient training and/or require fewer training data.

Configuring a control agent for a technical system comprises reading in predefined training data, a respective training dataset comprising a state dataset that specifies a state of the technical system, an action dataset that specifies a control action and a performance value of the technical system that results from an application of the control action. The training data are taken as a basis for training a data-based dynamic model to take a state dataset and an action dataset as a basis for reproducing a resulting performance value. Furthermore, the training data are taken as a basis for training an action evaluation process to take a state dataset and an action dataset, after a reduction of information, as a basis for reproducing the action dataset, with a reproduction error being ascertained. In addition, the trained dynamic model, the trained action evaluation process and the control agent are supplied with training data. Performance values output by the trained dynamic model are fed to a predefined performance function. Moreover, reproduction errors output by the trained action evaluation process are fed to the performance function as performance-diminishing influencing variables. Furthermore, the control agent is trained to take a state dataset as a basis for outputting an action dataset that optimizes the performance function. The training configures the control agent to control the technical system in an optimized manner.

To carry out the method according to embodiments of the invention, there is provision for an appropriate control device, a computer program product (non-transitory computer readable storage medium having instructions, which when executed by a processor, perform actions) and a computer-readable nonvolatile storage medium.

The method according to embodiments of the invention and the control device according to embodiments of the invention can be carried out, or implemented, by means of one or more computers, processors, application-specific integrated circuits (ASICs), digital signal processors (DSPs) and/or so-called "field programmable gate arrays" (FPGAs), for example.

An advantage of embodiments of the invention can be seen in particular in that considerably fewer training data are often required for successful training than for learning a Q function. Moreover, the method according to embodiments of the invention is in many cases less susceptible to an accumulation of forecasting errors than training of a Q function.

Furthermore, it can be observed that the reproduction error is frequently smaller in state and control action regions having good coverage by the training data than in regions with poor coverage. The reproduction error can therefore generally be regarded as a measure of the extent to which a respective control action is covered by the training data in a respective state. If the reproduction error is used as a performance-diminishing influencing variable when training the control agent, negative effects of regions having poor coverage by training data on the success of a training can be effectively reduced.

According to one advantageous embodiment of the invention, the action evaluation process can be carried out by means of a variational autoencoder, by means of an autoencoder and/or by means of generative adversarial networks. The use of an autoencoder or in particular a variational autoencoder allows a reduced-information and/or less-redundant rendering of the state datasets and action datasets that are fed in to be ascertained. Moreover, it is easily possible to ascertain a measure of how precisely in particular the action datasets can be reconstructed from the reduced variables again. This measure can advantageously be used as the reproduction error.

Furthermore, training the control agent can comprise feeding a respective state dataset to the control agent and feeding the state dataset and an action dataset output by the control agent both to the trained dynamic model and to the trained action evaluation process. This allows the action dataset output by the control agent that is to be trained to be evaluated directly by the action evaluation process.

According to another advantageous embodiment of the invention, a respective training dataset can comprise a subsequent state dataset that specifies a subsequent state of the technical system that results from an application of the control action. The dynamic model can then be trained on the basis of the training data to take a state dataset and an action dataset as a basis for reproducing a resulting subsequent state dataset. The training of the control agent can then involve the trained dynamic model, the trained action evaluation process and/or the control agent each being supplied with subsequent state datasets output by the trained dynamic model. Performance values and/or reproduction errors ascertained for the supplied subsequent state datasets can then be fed to the performance function. This allows a state and a control action to be gradually extrapolated into the future, or predicted, and as such a control trajectory comprising multiple time steps to be ascertained. Such an extrapolation is frequently also referred to as a rollout or virtual rollout. A performance cumulated over multiple time steps can then be calculated for the control trajectory by means of the performance function and assigned to the control action at the start of the trajectory. Such a cumulated performance is frequently also referred to as a return in the context of reinforcement learning. To calculate the return, the performance values ascertained for future time steps can be discounted, i.e., provided with weights that decrease for each time step.

A gradient-based optimization method, a stochastic optimization method, particle swarm optimization and/or a genetic optimization method can be used for training the control agent. A large number of efficient implementations are available for said methods.

BRIEF DESCRIPTION

Some of the embodiments will be described in detail, with reference to the following figures, wherein like designations denote like members, wherein.

DETAILED DESCRIPTION

Where identical or corresponding reference signs are used in different figures, these reference signs denote the same or corresponding entities, which may be implemented or designed in particular as described in connection with the relevant figure.

Figure 1:
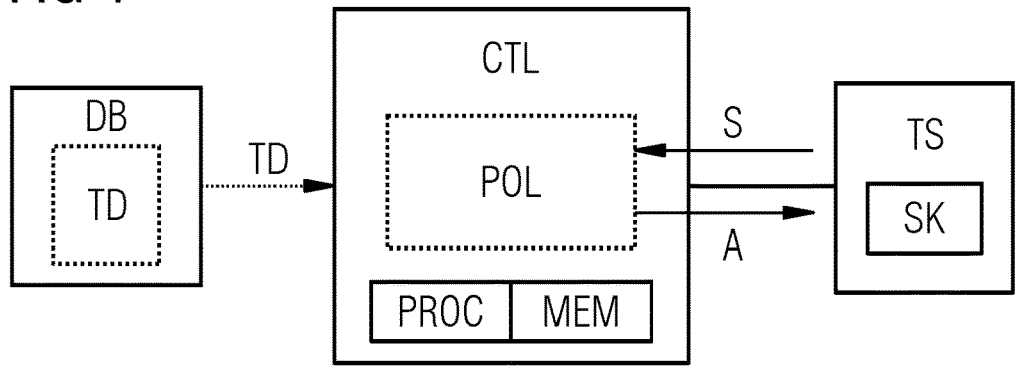
FIG. 1 shows a control device according to embodiments of the invention when controlling a technical system.

FIG. 1 illustrates a control device CTL according to embodiments of the invention when controlling a technical system TS, e.g., a gas turbine, a wind turbine, a steam turbine, a chemical reactor, a milling machine, a production plant, a factory, a robot, a motor vehicle, a motor, a cooling plant, a heating plant, a power plant or a different machine, a different device or a different plant. In particular, a component or a subsystem of an assembled technical system can also be regarded as a technical system TS. The technical system TS has a sensor system SK for continually capturing and/or measuring system states or subsystem states of the technical system TS. It will be assumed for the present exemplary embodiment that the technical system TS controlled is a gas turbine.

In FIG. 1, the control device CTL is shown externally to the technical system TS and is coupled thereto. Alternatively, the control device CTL may also be wholly or partly integrated in the technical system TS.

The control device CTL has one or more processors PROC for carrying out method steps of the control device CTL and has one or more memories MEM coupled to the processor PROC for storing the data that are to be processed by the control device CTL.

Furthermore, the control device CTL has a learning-based control agent POL that can be trained using reinforcement learning methods. Such a control agent is frequently also referred to as a policy, or agent for short. In the present exemplary embodiment, the control agent POL is implemented as an artificial neural network.

The control agent POL and therefore the control device CTL are trained in a data-driven manner on the basis of predefined training data in advance and are thus configured to control the technical system TS in an optimized manner. The training data for training the control agent POL are taken from a database DB that stores the training data in the form of a multiplicity of training datasets TD. The stored training datasets TD were recorded on the technical system TS or a similar technical system in advance and/or generated by simulation or in a data-driven manner. On the basis of these offline training data, the control agent POL is trained, according to embodiments of the invention, to ascertain a performance-optimizing control action for a respective predefined state of the technical system TS. The sequence of this training is explained more precisely below.

After the training has concluded, the trained control agent POL can be used to control the technical system TS in an optimized manner. For this purpose, state datasets S of the technical system TS are transferred to the control device CTL. The state datasets S each specify a state, in particular an operating state, of the technical system TS and are each represented by a numerical state vector. The state datasets S can comprise measurement data, sensor data, environment data or other data that arise during the operation of the technical system TS or that influence operation. For example, data about temperature, pressure, settings, actuator positions, valve positions, emissions, utilization, resource consumption and/or capacity of the technical system TS or of its components. In the case of a production plant, the state datasets can also relate to a product quality or another product property. At least some of the state datasets S can be measured by the sensor system SK of the technical system TS or ascertained by simulation by means of a simulator of the technical system.

The state datasets S transferred to the control device CTL are supplied to the trained control agent POL as input data. A respective supplied state dataset S is taken as a basis for the trained control agent POL to generate a performance-optimizing control action in the form of a respective action dataset A. A respective action dataset A in this context specifies a control action that can be carried out on the technical system TS, or a corresponding control signal. The generated action datasets A are transferred from the control agent POL, or from the control device CTL, to the technical system TS. The transferred action datasets A control the technical system TS in an optimized manner by virtue of the control actions specified by the action datasets A being executed by the technical system TS.

Figure 2:
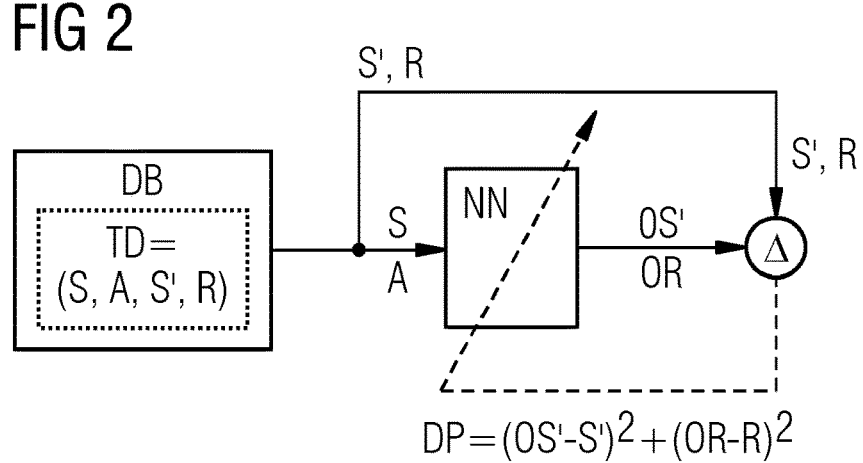
FIG. 2 shows a training of a data-based dynamic model for the technical system.

FIG. 2 illustrates a training of a data-based dynamic model NN for the technical system TS. The dynamic model NN can be trained in a data-driven manner and is intended to model a state transition when a control action is applied to a predefined state of the technical system TS. Such a dynamic model is frequently also referred to as a transition model or system model. The dynamic model NN can be implemented in the control device CTL or wholly or in part externally thereto. In the present exemplary embodiment, the dynamic model NN is implemented as an artificial neural network.

The dynamic model NN is intended to take the training datasets TD contained in the database DB as a basis for being trained to take a respective state and a respective control action as a basis for predicting a subsequent state of the technical system TS that results from application of the control action and a performance value resulting therefrom as accurately as possible.

The dynamic model NN is trained on the basis of the training datasets TD stored in the database DB. A respective training dataset TD in this context comprises a state dataset S, an action dataset A, a subsequent state dataset S' and a performance value R. As already mentioned above, the state datasets S each specify a state of the technical system TS and the action datasets A each specify a control action that can be carried out on the technical system TS. Accordingly, a respective subsequent state dataset S' specifies a subsequent state of the technical system TS that results from application of the respective control action to the respective state. Finally, the respective associated performance value R quantifies a respective performance of an execution of the respective control action in the respective state. The performance value R in this context can relate in particular to a currently resulting capacity, a currently resulting emission value, a currently resulting resource consumption, a currently resulting product quality and/or other operating parameters that result from the current control action's being carried out. In the context of machine learning, such a performance value is also referred to using the terms reward or—complementarily—costs or loss.

Training the dynamic model NN comprises supplying the dynamic model NN with state datasets S and action datasets A as input data. The dynamic model NN is intended to be trained in such a way that the output data therefrom reproduce a respective resulting subsequent state and a respective resulting performance value as accurately as possible. The training is carried out by means of a supervised machine learning method.

A training in this context is intended to be understood generally to mean an optimization of a mapping of input data, here S and A, of a machine learning model, here NN, to the output data therefrom. This mapping is optimized based on predefined, learnt and/or learnable criteria during a training phase. The criteria used can be, in particular in the case of control models, the success of a control action or, in the case of prediction models, a prediction error. By way of example, the training can set, or optimize, networking structures of neurons of a neural network and/or weights of connections between the neurons in such a way that the predefined criteria are satisfied as well as possible. The training can therefore be regarded as an optimization problem. A large number of efficient optimization methods are available for such optimization problems in the field of machine learning. Optimization in this context will always also be understood to mean an approach toward an optimum.

In particular artificial neural networks, recurrent neural networks, convolutional neural networks, perceptrons, Bayesian neural networks, autoencoders, variational autoencoders, deep learning architectures, support vector machines, data-driven regression models, k nearest neighbor classifiers, physical models or decision trees are able to be trained.

In the case of the dynamic model NN, the latter—as already mentioned above—is supplied with state datasets S and action datasets A from the training data as input data. For a respective input dataset (S, A), the dynamic model NN outputs an output dataset OS' as the subsequent state dataset and an output dataset OR as the performance value. The aim of the training of the dynamic model NN is for the output datasets OS' to match the actual subsequent state datasets S' and for the output datasets OR to match the actual performance values R as well as possible. To this end, a discrepancy DP between the output datasets (OS', OR) and the corresponding datasets (S', R) contained in the training data is ascertained. The discrepancy DP represents a prediction error of the dynamic model NN. The discrepancy DP can be ascertained for example by calculating a Euclidean distance between the respective vectors to be represented, e.g. in accordance with $DP=(OS'-S')^2+(OR-R)^2$.

As indicated by a dashed arrow in FIG. 2, the discrepancy DP is fed back to the dynamic model NN. The fed-back discrepancy DP is taken as a basis for training the dynamic model NN to minimize this discrepancy DP and therefore the prediction error. A large number of efficient optimization methods are available for minimizing the discrepancy DP, e.g., gradient-based optimization methods, stochastic gradient descent methods, particle swarm optimizations and/or genetic optimization methods. The minimization of the discrepancy DP trains the dynamic model NN to predict a resulting subsequent state and a resulting performance value for a predefined state and a predefined control action as accurately as possible.

Figure 3:
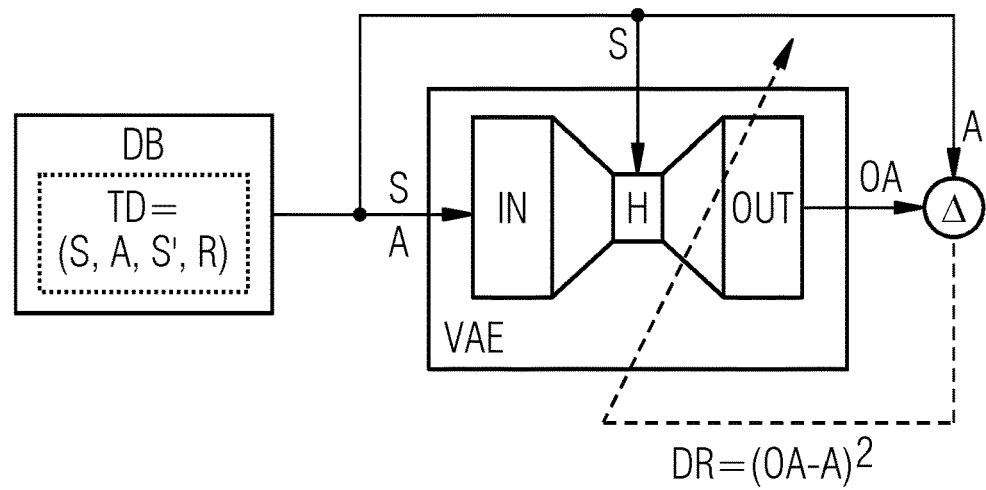
FIG. 3 shows a training of a variational autoencoder.

FIG. 3 illustrates a training of a variational autoencoder VAE, which, according to embodiments of the invention, acts as a data-driven action evaluation process. The variational autoencoder VAE can be implemented in the control device CTL or wholly or partly externally thereto. The variational autoencoder VAE is used to evaluate a respective state-specific control action with regard to its reproducibility. As explained more specifically below, this reproducibility proves to be a measure of a similarity between a respective state-specific control action and the control actions present in the training data, or to be a measure of a probability of occurrence in the training data.

In the present exemplary embodiment, the variational autoencoder VAE is implemented as a Bayesian neural network and comprises an input layer IN, a hidden layer H and an output layer OUT. Besides the hidden layer H, the variational autoencoder VAE can comprise further hidden layers. A characteristic of an autoencoder is that the hidden layer H is significantly smaller, i.e. comprises fewer neurons, than the input layer IN or the output layer OUT.

The variational autoencoder VAE is intended to be trained on the basis of training data read in from the database DB to take fed-in state datasets S and action datasets A—after a reduction of information due to the smaller hidden layer H—as a basis for reproducing the fed-in action datasets A as accurately as possible. A reproduction error DR is also intended to be ascertained at the same time.

To this end, state datasets S and action datasets A from the training data are fed to the input layer IN as input data and processed by the layers IN, H and OUT. Finally, the processed data are output by the output layer OUT as output data OA, which the action datasets A fed in are intended to reproduce as accurately as possible in accordance with the aim of the training. State datasets S are also supplied to the hidden layer H.

In so far as the input data, here S and A, need to pass through the smaller hidden layer H to a certain extent and, in accordance with the aim of the training, are intended to be largely reconstructable again from the smaller or reduced volume of data that is present there, a reduced-data representation of the input data is obtained in the hidden layer H. The variational autoencoder VAE learns an efficient coding, or compression, of the input data in this way. As a result of state datasets S also being fed directly to the hidden layer H, it is possible to achieve the effect that specifically the action datasets A are more effectively encoded, or reduced, or represented in the hidden layer H.

The training produces a so-called latent parameter space or a latent representation in particular of the action datasets A, or of the control actions specified thereby, in the hidden layer H. The data present in the hidden layer H correspond to an abstract and reduced-information rendering of the state-specific control actions contained in the training data.

To achieve the above training aim, an optimization method is carried out that sets processing parameters of the variational autoencoder VAE in such a way that the reproduction error DR is minimized. The reproduction error, or reproduction uncertainty, DR ascertained in this case can be in particular a distance between the output data OA and the fed-in action datasets A, in accordance with $DR=(OA-A)^2$.

Training the variational autoencoder VAE, or optimizing its processing parameters, comprises feeding back the calculated distances DR—as indicated by a dashed arrow in FIG. 3—to the variational autoencoder VAE. A large number of efficient standard methods can be used for actually carrying out the training.

Following a successful training, an arbitrary pair comprising a respective state dataset S and a respective action dataset A can be evaluated by means of the trained variational autoencoder VAE with regard to how well the respective action dataset A can be reconstructed from the reduced-information rendering in the hidden layer H. It is to be expected that state-control action pairs that occur frequently in the training data will have a smaller reproduction error DR than state-control action pairs that occur rarely in the training data. The reproduction error DR of the trained variational autoencoder VAE can thus be used as a measure of how well a respective state-control action pair is covered by the training data, or how frequently or how probably it occurs there.

Figure 4:
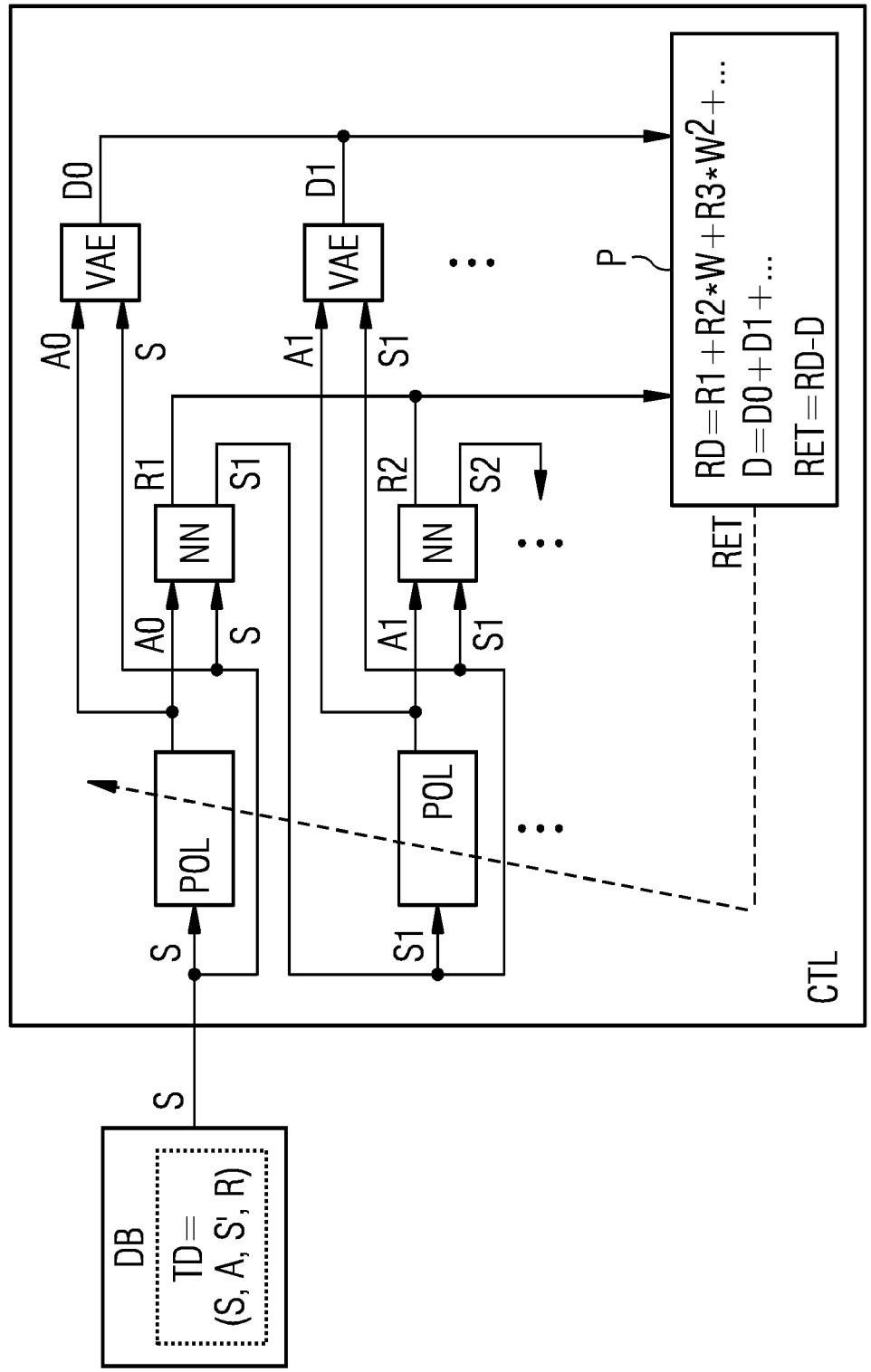
FIG. 4 shows a training of a control agent of the control device.

FIG. 4 illustrates a training of the control agent POL of the control device CTL by means of the trained dynamic model NN and the trained variational autoencoder VAE. To illustrate successive work steps, FIG. 4 shows multiple instances of each of the control agent POL, the trained dynamic model NN and the trained variational autoencoder VAE. The different instances can correspond in particular to different calls or assessments of routines by means of which the control agent POL, the trained dynamic model NN or the trained action evaluation process VAE is implemented.

As already mentioned above, the control agent POL is intended to be trained to ascertain a performance-optimizing control action in the form of an action dataset A for a respective predefined state dataset S. The training is carried out on the basis of the training data stored in the database DB.

The training comprises feeding a large volume of state datasets S from the database DB to the control agent POL as input data. A respective state dataset S specifies a respective given state of the technical system TS. The respective given state is taken as a basis for the trained dynamic model NN to predict subsequent states of the technical system TS that result from application of control actions. Moreover, the predicted subsequent states and the given state are evaluated by the trained variational autoencoder VAE.

For these purposes, the state datasets S are also supplied to the trained dynamic model NN and the trained variational autoencoder VAE as input data.

The control agent POL derives output data A0 from a respective state dataset S and outputs said data as the action dataset. The action dataset A0, together with the respective state dataset S, is fed to the trained dynamic model NN, which predicts a subsequent state therefrom and outputs a subsequent state dataset S1 that specifies the latter, and also an associated performance value R1.

Moreover, the action dataset A0, together with the respective state dataset S, is fed to the trained variational autoencoder VAE, which ascertains therefrom a reproduction error D0 for the action dataset A0 and outputs said error.

The subsequent state dataset S1 is in turn fed to the control agent POL, which derives an action dataset A1 for the subsequent state therefrom. The action dataset A1, together with the respective subsequent state dataset S1, is fed to the trained dynamic model NN, which predicts a further subsequent state therefrom and outputs a subsequent state dataset S2 that specifies the latter, and also an associated performance value R2. Moreover, the action dataset A1, together with the subsequent state dataset S1, is fed to the trained variational autoencoder VAE, which ascertains therefrom a reproduction error D1 for the action dataset A1 and outputs said error.

The above method steps can be iteratively repeated, with performance values and reproduction errors being ascertained for further subsequent states. The iteration can be terminated when a termination condition is present, e.g., when a predefined number of iterations is exceeded. In this way, a control trajectory comprising multiple time steps and progressing from subsequent state to subsequent state can be ascertained with associated performance values R1, R2, . . . and reproduction errors D0, D1, . . . .

To ascertain an overall performance of a respective control trajectory, the ascertained performance values R1, R2, . . . and the ascertained reproduction errors D0, D1, . . . are supplied to a performance function P.

The performance function P ascertains an expected overall performance RET for a respective control trajectory, i.e., a performance cumulated over multiple time steps, which is frequently also referred to as a return in the context of reinforcement learning. The cumulated performance RET is then assigned to the control action, here A0, at the start of the trajectory and thus evaluates a current ability of the control agent POL to ascertain a favorable, performance-optimizing control action, here A0, for a respective state dataset S. The cumulated performance RET is calculated by the performance function P as a performance discounted over the future time steps of a control trajectory.

To this end, the performance function P calculates a weighted sum RD of the performance values R1, R2, . . . , the weights of which are multiplied by a discounting factor W<1 with every time step into the future. This allows the weighted sum to be calculated in accordance with RB=R1+ R2*W+R3*W$^2$+ . . . . For the discounting factor W it is possible to use e.g. a value of 0.99 or 0.9.

Furthermore, the ascertained reproduction errors D0, D1, . . . are included in the calculation of the overall performance RET as performance-diminishing influencing variables by the performance function P. Such a performance-diminishing influencing variable is frequently also referred to as a penalty in the context of reinforcement learning. In the present exemplary embodiment, the individual reproduction errors D0, D1, . . . are summed to produce a total reproduction error D=D0+D1+ . . . . The overall performance RET is thus calculated in accordance with RET=RD–D.

Training the control agent POL, i.e., optimizing its processing parameters, comprises feeding back the overall performance RET—as indicated by a dashed arrow in FIG. 4—to the control agent POL. The processing parameters of the control agent POL are set, or configured, in such a way that the overall performance RET is maximized. A large number of efficient standard methods, in particular of reinforcement learning, can be used for actually carrying out the training.

Since a high overall reproduction error D diminishes the overall performance RET of a trajectory, a disadvantageous influence of control actions with a high reproduction error on the training is effectively reduced. As already mentioned above, such control actions probably have less coverage by the training data and would probably negatively influence the success of a training.

It is found that the method according to embodiments of the invention can generally significantly improve the success of a training of the control agent POL, in particular in the case of an offline training. Compared to training a Q function, often significantly fewer training data are also required.

Following successful training of the control agent POL, the latter can be used to control the technical system TS in an optimized manner, as described in connection with FIG. 1.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A computer-implemented method for configuring a control agent for a technical system, wherein
   a) predefined training data are read in, a respective training dataset comprising a state dataset that specifies a state of the technical system, an action dataset that specifies a control action and a performance value of the technical system that results from an application of the control action,
   b) a data-based dynamic model is trained on a basis of the training data to take a state dataset and an action dataset as a basis for reproducing a resulting performance value,
   c) an action evaluation process is trained on the basis of the training data to take a state dataset and an action dataset, after a reduction of information, as a basis for reproducing the action dataset, with a reproduction error being ascertained,
   d) the trained dynamic model, the trained action evaluation process and the control agent are supplied with training data, wherein
      performance values output by the trained dynamic model are fed to a predefined performance function,
      reproduction errors output by the trained action evaluation process are fed to the performance function as performance-diminishing influencing variables, and
      the control agent is trained to take a state dataset as a basis for outputting an action dataset that optimizes the performance function,
   e) the control agent is configured by the training to control the technical system in an optimized manner, and
   f) control the technical system in an optimized manner by the trained control agent.

2. The method as claimed in claim 1, wherein the action evaluation process is carried out by means of a variational autoencoder, by means of an autoencoder and/or by means of generative adversarial networks.

3. The method as claimed in claim 1, wherein training the control agent comprises feeding a respective state dataset to the control agent and feeding the state dataset and an action dataset output by the control agent both to the trained dynamic model and to the trained action evaluation process.

4. The method as claimed in claim 1, wherein a respective training dataset comprises a subsequent state dataset that specifies a subsequent state of the technical system that results from an application of the control action,
   in that the dynamic model is trained on the basis of the training data to take a state dataset and an action dataset as a basis for reproducing a resulting subsequent state dataset,
   in that the training of the control agent involves the trained dynamic model, the trained action evaluation process and/or the control agent each being supplied with subsequent state datasets output by the trained dynamic model, and
   in that performance values and/or reproduction errors ascertained for the supplied subsequent state datasets are fed to the performance function.

5. The method as claimed in claim 1, wherein a gradient-based optimization method, a stochastic optimization method, particle swarm optimization and/or a genetic optimization method is used for training the control agent.

6. The method as claimed in claim 1, wherein the performance function forms weighted sums or weighted differences for performance values and reproduction errors.

7. The method as claimed in claim 1, wherein the dynamic model, the control agent and/or the action evaluation process comprises an artificial neural network, a recurrent neural network, a convolutional neural network, a multilayer perceptron, a Bayesian neural network, an autoencoder, a deep learning architecture, a support vector machine, a data-driven trainable regression model, a k nearest neighbor classifier, a physical model and/or a decision tree.

8. The method as claimed in claim 1, wherein the technical system is a gas turbine, a wind turbine, a steam turbine, a chemical reactor, a milling machine, a production plant, a factory, a robot, a motor, a cooling plant, a heating plant or a different machine, a different device or a different plant.

9. A control device for controlling a technical system, configured to carry out the method as claimed in claim 1.

10. A computer program product, comprising a computer readable hardware storage device having computer readable program code stored therein, said program code executable by a processor of a computer system to implement a method configured to carry out the method as claimed in claim 1.

11. A non-transitory computer-readable storage medium containing the computer program product as claimed in claim 10.

* * * * *